UNITED STATES PATENT OFFICE.

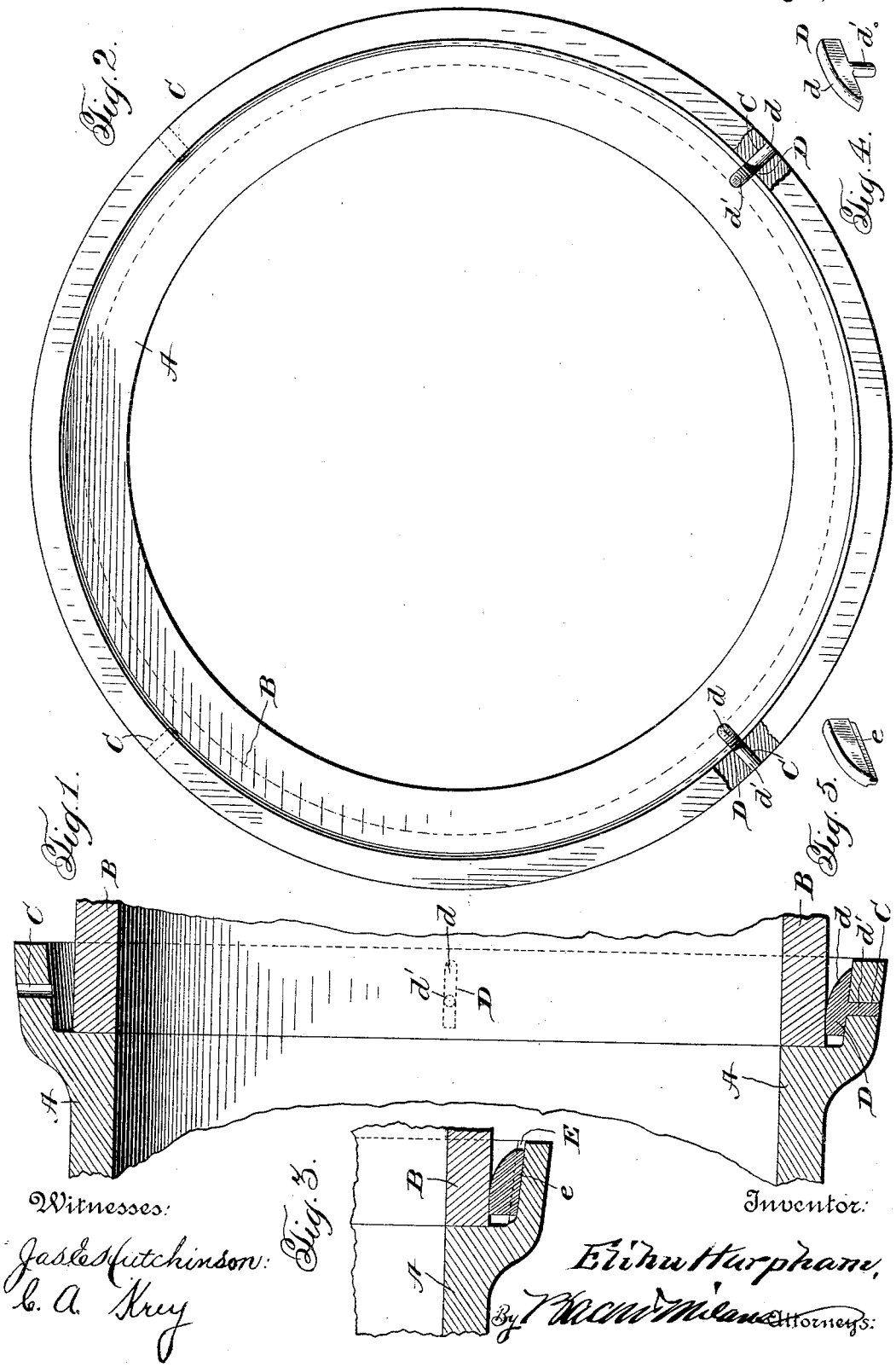

ELIHU HARPHAM, OF AKRON, OHIO.

DRAIN OR SIMILAR PIPE.

No. 929,942.     Specification of Letters Patent.     Patented Aug. 3, 1909.

Application filed March 8, 1909. Serial No. 481,979.

*To all whom it may concern:*

Be it known that I, ELIHU HARPHAM, a citizen of the United States, residing at Akron, in the county of Summit and State of Ohio, have invented certain new and useful Improvements in Drain or Similar Pipes, of which the following is a specification, reference being had therein to the accompanying drawing.

This invention relates to an improvement in drain or similar pipes, especially such as are made of earthen ware, and it consists generally in an improved construction of such pipes whereby centering devices of a removable character may be employed and adjusted, and when adjusted retained in such adjusted position.

The invention also consists in the combination of a pipe section of a centering device, conveniently of the self-centering type, so arranged and constructed that it may be placed and secured in proper position for service.

Heretofore, in this art it has been suggested to form on the inner wall of the socket member, a series of integral projections serving as self-centering means for properly positioning the spigot end in the socket end of an adjacent pipe. It has, however, been found in such structures that it was always necessary to invariably adjust the pipe so that said integral centering projections would be at the bottom, and so irrespective of the condition of the ends of the pipe sections.

It is well known that in forming drain pipe sections, it is quite impossible to have the same always of the exact shape and contour, warping often occurring during the manufacture. This has rendered, in the past, sections of pipes having fixed centering devices useless in many instances, especially where exact work is required. It has also been suggested to place a removable centering device in the socket end of a pipe, shaping the device to fit the contour of the inner face of the socket and outer surface of the spigot end of the companion pipe. Such devices, however, have been found expensive and are very apt to be misplaced in adjusting the pipe sections.

My invention has for its object the production of a removable or detachable centering device of comparatively small dimensions and to so fashion the pipe sections that such removable or detachable device can be readily placed in position and there retained.

A further object is the provision of a structure, as above indicated, which can be applied at different points throughout the interior of the socket end of the pipe section, and when adjusted to such positions will serve as a centering means for the flow line of the pipes.

In addition to the above stated objects, one of the purposes of the invention is to provide a centering device which can be attached to the pipe section in a manner to prevent displacement and which will serve as a self centering device.

In my present form of the invention I employ a relatively small lug or block, but the particular form shown may be varied.

In the accompanying drawing, I have shown an embodiment of the invention, but it is to be understood that while the construction shown is one of manifest utility and possesses many advantages, yet the invention is not limited to the particular arrangement and construction shown, and in this particular I desire it understood that many changes can be made without departing from the spirit and nature of the invention.

In the drawings, Figure 1 is a sectional view of the adjacent ends of two pipe sections showing the self-centering device in position, Fig. 2 is an end view showing in dotted lines and partly in section the socket end of the pipe with two self-centering devices in place, Fig. 3 is a detail section of a part of the socket end of a pipe showing a self-centering device and its seat in modified form. Fig. 4 is a detail perspective view of a centering lug, and Fig. 5 is a similar view of a modified form of a centering lug.

In the drawing, A designates the socket end of a drain or other form of pipe, B the spigot end. In the flanged part of the socket end, which is that part extending forward from the shoulder on the pipe A against which shoulder the end of the adjacent pipe abuts when in position I form a series of perforations or seats C, extending conveniently through the flange. These seats may be readily made in the flanged end of the socket when the material is in a green state and easily penetrated. The seats or perforations are arranged, by preference, an equi-distance apart and in different portions of the flange. Four of the seats are shown, one at the top and one at the bottom, with one at each side, so that one or two of the seats can be employed for retaining purposes.

D designates the centering lug which is conveniently formed with an inclined forward surface, as at $d$, a lower surface fashioned to conform to the contour of the inner face of the socket flange, and a detent or projection $d'$ on the under side, fashioned to fit the perforation or seat C. These lugs are of a height to approach approximately the plane of the outer face of the body of the pipe section and in width may be made relatively small to offer thereby but slight obstruction to the entrance of the sealing cement used in completing the joint. The formation of the pipe section with a plurality of perforations or seats with which the projections on the centering devices coöperate and thereby are held in position, is an important feature of the invention, in that very frequently pipes are met which are somewhat warped or bent, and it is necessary to adjust the pipe so that its straightest and most nearly even inner surface may be presented downwardly to constitute a straight flow line. This the operator can readily accomplish by adjusting the pipe to suit conditions and then placing in the lowermost perforations or seats, one or more centering devices as may be required. The spigot end of the adjacent pipe may now be forced into position, being self-centered in the act of positioning, and there held ready to receive the cement filling.

In Fig. 3, I have shown a slightly modified form of self-centering device and perforation. In this particular form a small groove is formed on the inner face of the flange of the socket member, as at E, and the self-centering lug is provided with a flange or projection $e$ fitting the groove.

The perforations or grooves in the flange of the socket may be readily formed during the process of manufacturing the pipe and before the same is hardened, and it will be observed that the strength of the flange is not materially weakened thereby.

The particular shape of the body of the lug may be altered to suit and, as stated, other changes can be made, but I believe I am the first to ever provide the flange of a socket in pipe section with a centering device which is removable and having means for retaining it in adjusted positions.

Having thus described my invention, what I claim as new and desire to secure by Letters Patent is:

1. A pipe section having a socket portion provided in its flange with a retaining seat for a centering device.

2. A pipe section having a socket portion formed with a flange having a series of seats therein for the reception of centering devices.

3. A pipe section having a socketed end and a removable centering device detachably secured to the flanged part of the socket.

4. A pipe section having a socketed end, a self-centering device located in the socket, and means on the flange of the socket for retaining the said centering device in place.

5. A pipe section having a socketed end formed with a series of perforations in its flange and a self-centering device having projections adapted to enter a perforation.

6. A pipe section having a socketed end formed in its flange with a series of perforations arranged equi-distance apart and self-centering devices having projections arranged to enter said perforations.

In testimony whereof I affix my signature in presence of two witnesses.

ELIHU HARPHAM.

Witnesses:
W. R. IRVIN,
C. F. SCHNEE.